UNITED STATES PATENT OFFICE.

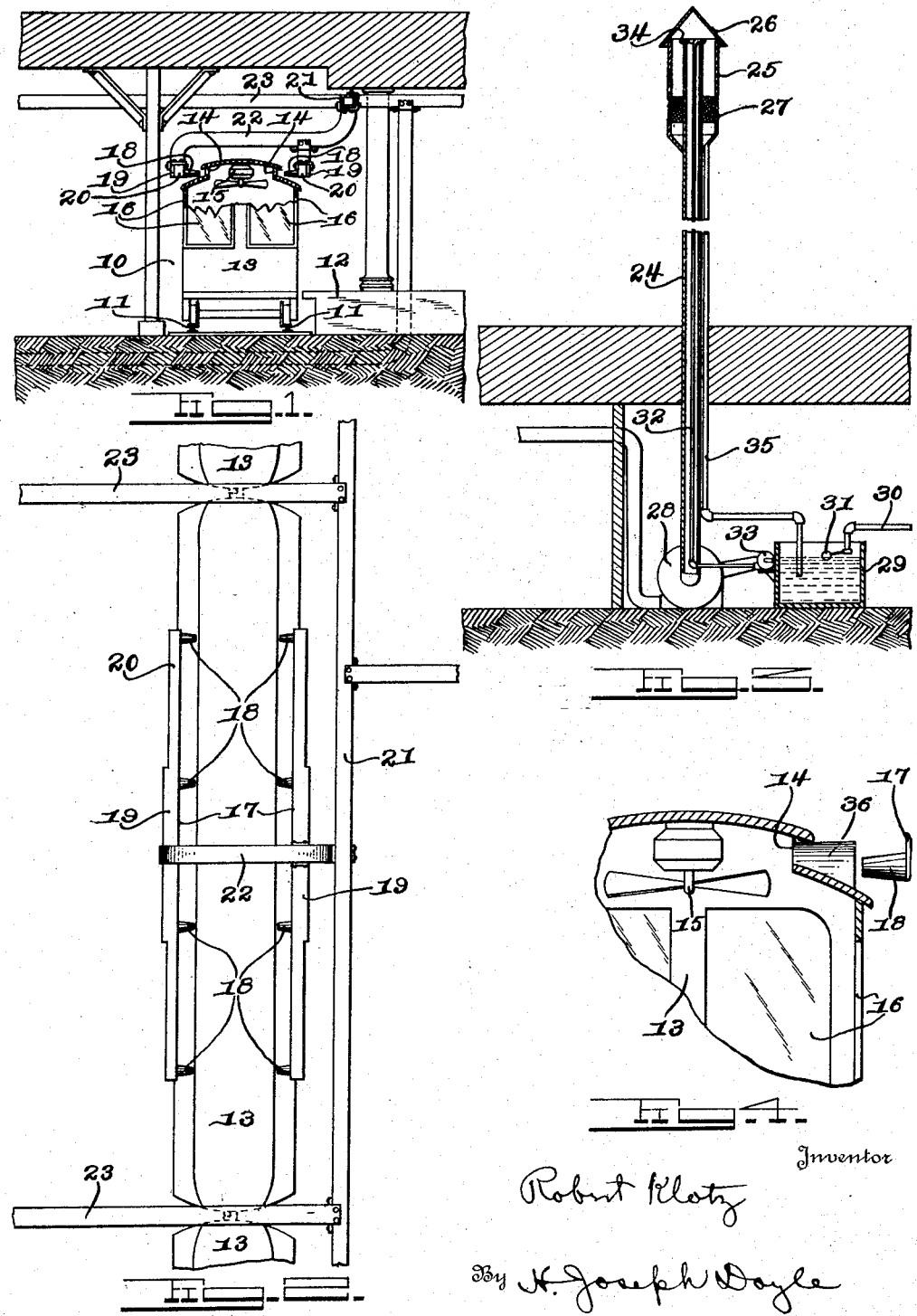

ROBERT KLOTZ, OF NEW YORK, N. Y.

VENTILATING SYSTEM.

1,189,971.  Specification of Letters Patent.  Patented July 4, 1916.

Application filed July 24, 1915. Serial No. 41,701.

*To all whom it may concern:*

Be it known that I, ROBERT KLOTZ, a citizen of the United States, residing at New York, in the county of New York and State of New York, have invented certain new and useful Improvements in Ventilating Systems, of which the following is a specification.

This invention is an improved system for the ventilation of cars operating in subways, tunnels and the like.

One of the objects of the invention is to provide means for introducing into a car or cars, fresh purified air, obtained from a source outside of a subway or tunnel in which the car or cars may be operating.

A further object is to provide means for introducing currents of air from a stationary device, into a movable car, whether in motion or at rest, and to further provide for the distribution of the fresh air thus introduced into the car.

The invention will be hereinafter fully set forth and particularly pointed out in the claims.

In the accompanying drawing:—Figure 1 is a transverse sectional view illustrating a portion of a subway, with the invention applied thereto. Fig. 2 is a plan view. Fig. 3 is a detail sectional view illustrating the air purifying apparatus. Fig. 4 is a sectional view illustrating a slight modification.

Referring to the drawings, 10 designates a subway or tunnel, provided with tracks 11, and a station platform 12. Cars 13, propelled in suitable manner, either singly or in trains, are arranged to travel upon the tracks 11, said cars being provided with ventilating openings 14 near the roof thereof, and one or more electric fans 15 suspended from the roof within each car. The cars are also provided with windows 16 of any preferred construction. Located within the subway or tunnel, on each side of each track, and at a level corresponding to the height of the ventilating openings 14, are distributing ducts or pipes 17 provided with discharge nozzles 18. Said nozzles are so arranged that they will extend over the roof of a car located between them, on both sides of the car, and in a position to discharge air through the ventilating openings 14 into the car. The distributing ducts or pipes 17 are provided with enlarged receiving chambers 19, and discharge branches 20, the nozzles 18 extending throughout the length of the ducts. Fresh air is supplied through a main supply duct or conduit 21, which communicates with the receiving chambers 19, by means of branch conduits 22, additional conduits 23 being provided to conduct air to distributing ducts located over other tracks, but not shown, it being understood that the distributing ducts 17 are duplicated for each track. The air to be supplied to the ventilating system is drawn in through an intake pipe 24, reaching above the street or ground level, the inlet end of said pipe being surrounded by a casing 25, provided with a cover 26 spaced above and extending over said inlet end. Air is drawn through a screened opening 27, in the casing 25, and passes upwardly to the inlet end of the intake pipe 24, being drawn into said intake pipe by the action of a blower 28, the outlet pipe from said blower communicating with the main supply duct or conduit 21. If desired the air supplied for ventilation may be washed in suitable manner. To accomplish this I have illustrated a tank 29 for containing water, the same being supplied in suitable manner, preferably from a water main, through a supply pipe 30, controlled by a float valve 31. Water from said tank is forced through a pipe 32, by means of a suitable pump 33, to a spray head 34, located within the casing 25, in such position that air entering the intake pipe 24, must pass through the water sprayed from said head. The water as it is discharged, flows to the bottom of the casing 25 and is conducted from said casing by a waste pipe to the tank 29.

In Fig. 4 I have shown a slight modification, in that the ventilating openings 14 are provided with funnels 36, for insuring the passage of a maximum quantity of fresh air into the car. This arrangement is of particular value where it is desired to ventilate a car which is operated outside of a tunnel or subway, or where it is desired to ventilate the car, in the manner herein described, while the car is in motion.

In operation, the distributing ducts 17 are preferably located at the stations within a tunnel or subway, so that when a car or train comes to a standstill at said station, the discharge nozzles 18 will force fresh air into the car through the ventilating openings 14, so that the fans 15 will distribute the same throughout the interior of the car, the air displaced thereby being forced outward through the car windows. It is obvious that even though the car or train does not come to rest at the station, a certain quantity of fresh air will be forced thereinto, as it passes the nozzles 18. Likewise, it is apparent that when the cars are not receiving fresh air in the manner herein contemplated, the station is receiving the benefit of the pure air discharged by the nozzles 18.

Having thus explained the nature of my invention and described an operative manner of constructing and using the same, although without attempting to set forth all of the forms in which it may be made, or all of the forms of its use, what I claim is:—

1. As an improved system of ventilation, the combination with a tunnel or subway, and a car movable therethrough, of distributing ducts located on opposite sides of the course traveled by said car, and means for forcing air from said ducts into the car while the car is located between the ducts.

2. As an improved system of ventilation, the combination with a tunnel or subway, and a car movable therethrough and provided with ventilating openings, of distributing ducts located on opposite sides of the course traveled by said car and provided with nozzles arranged to discharge into said ventilating openings, and means for forcing air through said ducts.

3. As an improved system of ventilation, the combination with a tunnel or subway, and a car movable therethrough provided with ventilating openings near the roof thereof, of distributing ducts located on opposite sides of the course traveled by said car and provided with means for discharging air into said ventilating openings, means for forcing air through said ducts, and fans located in said car near the roof thereof.

4. As an improved system of ventilation, the combination with a tunnel or subway, and a car movable therethrough and provided with ventilating funnels, of distributing ducts located on opposite sides of the course traveled by said car and provided with means for discharging air into said funnels, and means for forcing air through said ducts.

In testimony whereof I affix my signature.

ROBERT KLOTZ.

Copies of this patent may be obtained for five cents each, by addressing the "Commissioner of Patents, Washington, D. C."